(12) United States Patent
Kocer

(10) Patent No.: US 12,708,922 B2
(45) Date of Patent: Aug. 18, 2026

(54) MULTIFUNCTIONAL NOZZLE ASSEMBLY FOR AGRICULTURAL VEHICLES

(71) Applicant: Raven Industries, Inc., Sioux Falls, SD (US)

(72) Inventor: Jared Ernest Kocer, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 18/918,644

(22) Filed: Oct. 17, 2024

(65) Prior Publication Data

US 2025/0121396 A1 Apr. 17, 2025

Related U.S. Application Data

(60) Provisional application No. 63/590,817, filed on Oct. 17, 2023.

(51) Int. Cl.

| | |
|---|---|
| ***B05B 15/65*** | (2018.01) |
| *A01C 23/04* | (2006.01) |
| *A01M 7/00* | (2006.01) |

(52) U.S. Cl.

CPC ............ *B05B 15/65* (2018.02); *A01C 23/047* (2013.01); *A01M 7/006* (2013.01)

(58) Field of Classification Search

CPC ..... B05B 15/65; B05B 13/005; B05B 15/658; A01C 23/047; A01M 7/006; A01M 7/0089

See application file for complete search history.

(56) References Cited

U.S. PATENT DOCUMENTS 5,850,974 A * 12/1998 Kettl ......................... B05B 1/32 239/602
2019/0350187 A1* 11/2019 Kocer ..................... B05B 12/04
(Continued)

FOREIGN PATENT DOCUMENTS

JP 2014117641 6/2014

OTHER PUBLICATIONS

"International Application Serial No. PCT US2024 051737, International Search Report mailed Dec. 30, 2024", 2 pgs.
(Continued)

*Primary Examiner* — Qingzhang Zhou
(74) *Attorney, Agent, or Firm* — Schwegman Lundberg & Woessner, P.A.

(57) ABSTRACT

Multifunctional nozzle assembly systems and methods are disclosed. An example includes a mounting block having a first mounting location and a second mounting location. A plurality of interchangeable mounting adapters are provided for mounting to the first mounting location. Each mounting adapter has an input and mounting hardware for coupling to a spray system of a particular vehicle type such as a sprayer or planter and an outlet for coupling to the mounting block. A plurality of interchangeable nozzles are provided for mounting to the second mounting location of the mounting block. Each nozzle has an input for coupling to the mounting block, an output, and a shuttle for modulating flow rate through the output. The nozzle outputs differ based on the particular vehicle type. The mounting block includes a stepper motor that interfaces with the shuttle of each of the nozzles to modulate the flow rate.

20 Claims, 9 Drawing Sheets

(56) References Cited

U.S. PATENT DOCUMENTS

| | | | | |
|---|---|---|---|---|
| 2021/0400866 | A1* | 12/2021 | Muff | A01C 23/023 |
| 2022/0105903 | A1* | 4/2022 | Sakai | B05B 1/3006 |
| 2023/0141867 | A1 | 5/2023 | Krosschell et al. | |

OTHER PUBLICATIONS

"International Application Serial No. PCT US2024 051737, Written Opinion mailed Dec. 30, 2024", 6 pgs.

* cited by examiner

MULTIFUNCTIONAL NOZZLE ASSEMBLY FOR AGRICULTURAL VEHICLES

CLAIM OF PRIORITY

This patent application claims the benefit of priority of Kocer U.S. Provisional Patent Application Ser. No. 63/590,817, entitled "MULTIFUNCTIONAL NOZZLE ASSEMBLY FOR AGRICULTURAL VEHICLES," filed on Oct. 17, 2023, which is hereby incorporated by reference herein in its entirety.

TECHNICAL FIELD

This document pertains generally, but not by way of limitation, to agricultural spraying and, in particular, multifunctional nozzle assembly systems and methods for agricultural vehicles.

BACKGROUND

Farmers rely on agricultural spraying to protect crops from pests and disease. Chemicals such as herbicides and pesticides are sprayed using many types of agricultural vehicles including sprayers and planters. The spraying systems employed on these vehicles are complex and include numerous components, including controllers and communication systems, and pumps, tanks, nozzles, and tubing.

OVERVIEW

The present inventor(s) have recognized, among other things, that a problem to be solved can include providing nozzle assembly systems that can be more efficiently used (e.g., made, re-used, and/or installed in a more effective manner). The present subject matter can help provide a solution to this problem, such as by providing a multifunctional nozzle assembly system that includes interchangeable parts that enable the system to be used on different agricultural vehicles with simple swapping of parts. This can, for example, reduce costs and simplify use and re-use of the assembly.

In one example, a multifunctional nozzle assembly system is provided. The system includes a universal mounting block having a first (e.g., upper) mounting location and a second (e.g., lower) mounting location. The system further includes one or more interchangeable mounting adapters configured for mounting to the first (e.g., upper) mounting location. Each of the interchangeable mounting adapters includes an input component for connecting to a liquid system of a particular vehicle type (e.g., a sprayer or a planter) and an outlet component for coupling to the mounting block at the first (e.g., upper) mounting location. The system also includes one or more interchangeable nozzle bodies configured for mounting to the mounting block at the second (e.g., lower) mounting location. Each interchangeable nozzle body includes an input fitting for coupling to the mounting block at the second (e.g., lower) mounting location. Each interchangeable nozzle body also includes a nozzle base and a shuttle for modulating flow rate through the nozzle base. The universal mounting block further includes an operator such as a stepper motor and a controller such as a motor controller. The operator is capable of interfacing with the shuttle of each of the interchangeable nozzle bodies to modulate the flow rate through the respective nozzle base.

In another example, an assembly method for a nozzle assembly system is provided. The method includes providing a universal mounting block including a first (e.g., upper) mounting location and a second (e.g., lower) mounting location, an operator such as a stepper motor and a controller. An output component of a first interchangeable mounting adapter is connected to the first mounting location of the mounting block. The first interchangeable mounting adapter can be configured for use with a first vehicle type (such as a sprayer or planter). An input fitting of a first interchangeable nozzle body is connected to the second mounting location of the mounting block. The first interchangeable nozzle body is also configured for use with the first vehicle type. In another example, the assembly can be disconnected from the first vehicle; a second, different mounting adapter and second, different nozzle body can be coupled to the universal mounting block, and the second mounting adapter can be coupled to a different type of vehicle. For example, the first mounting adapter and nozzle body can be configured for use with a sprayer and the second mounting adapter and nozzle body can be configured for use with a planter.

By providing a universal mounting block and interchangeable mounting adapters and nozzle bodies, the present subject matter can provide one or more of the following advantages. The present subject matter can allow for increased efficiency for manufacturing of nozzle assemblies. For example, the present subject avoids the need to provide a dedicated component with expensive hardware (e.g., motor, motor controller, flow meter) for spray systems for different types of vehicles. Instead, the present subject matter provides a universal mounting block that can operate with less expensive adapters and nozzle bodies for different vehicles. The present systems can be more efficiently used and re-used. For example, a user can disconnect a multifunctional nozzle assembly system from one type of vehicle (e.g., a sprayer) and reconnect a multifunctional nozzle system to a different type of vehicle (e.g., a planter) by swapping out the mounting adapter and nozzle body while re-using the universal mounting block. These and other advantages can be provided by the system and methods described herein.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present subject matter provides multifunctional nozzle assembly systems with interchangeable parts and a common, universal mounting block. The nozzle assembly systems are particularly useful with agricultural sprayers and planters. The subject matter is however not limited to sprayers and planters but can be used with other vehicles which spray fluids.

Figure 1:
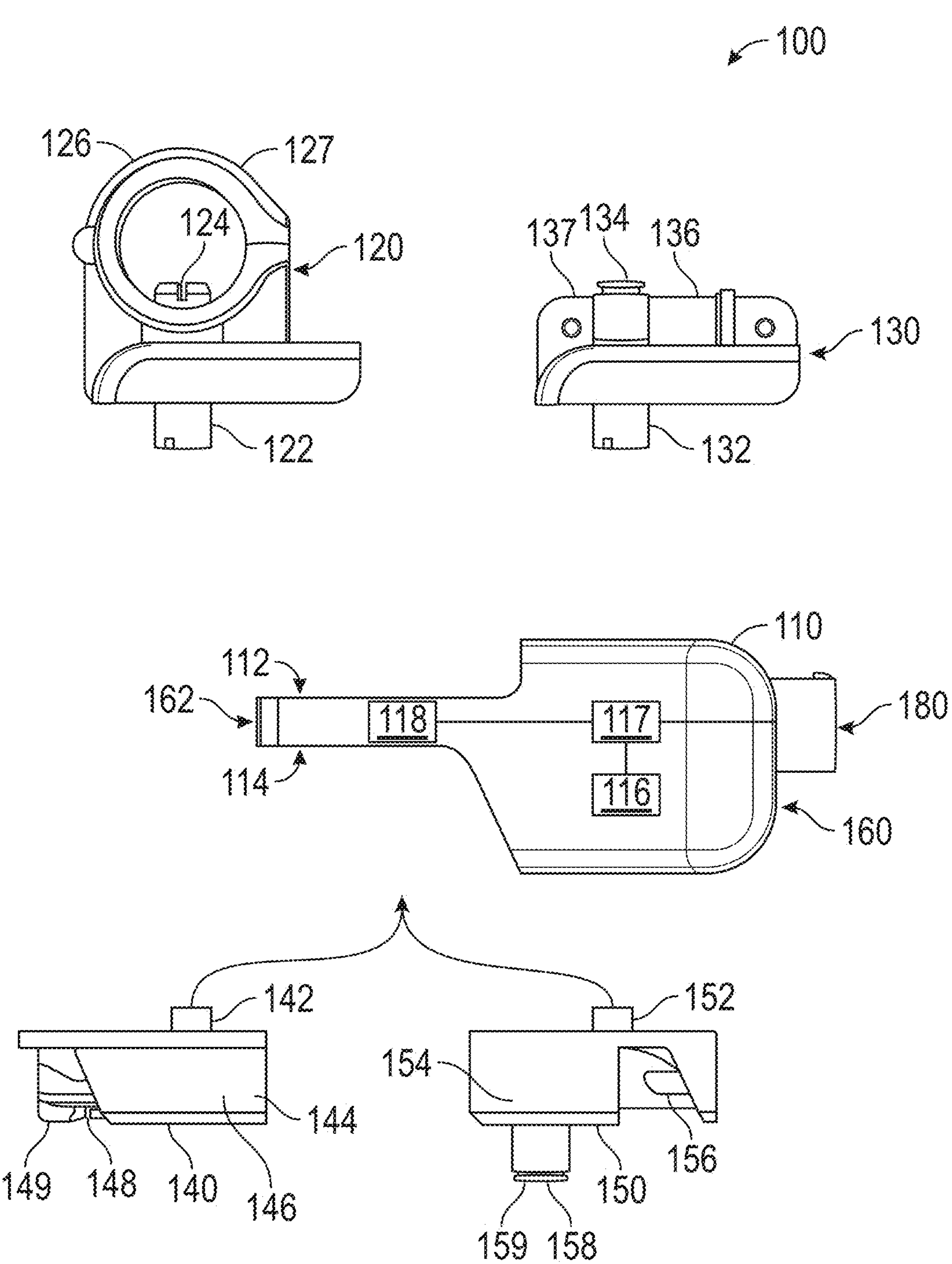
FIG. 1 illustrates a perspective view of an example multifunctional nozzle assembly system according to embodiments of the present subject matter.

FIG. 1 illustrates an example multifunctional nozzle assembly system 100 in accordance with various embodiments of the present subject matter. The system 100 includes a universal mounting block 110 having a first mounting location 112 and a second mounting location 114. While the orientation of the mounting block 110 can vary, for convenience and not by way of limitation, the first mounting location 112 is referred to as the upper mounting location and the second mounting location 114 is referred to as the lower mounting location. The universal mounting block 110 can further include an operator 116 and a controller 117 such as a stepper motor and motor controller (e.g., a microprocessor, PCB, and/or other circuitry and components). The mounting block 110 can also include a flow meter 118, as discussed further below. A manual or electric on/off shutoff can also be provided at, for example, the upper mounting location 112 to allow the nozzle assembly system 100 to be quickly turned off.

The system 100 further includes one or more interchangeable mounting adapters 120, 130. Each mounting adapter 120, 130 is configured for coupling with the upper mounting location 112 of the mounting block 110. For example, each mounting adapter 120, 130 includes an outlet component 122, 132 which connects with the upper mounting location 112 of the mounting block 110. In some examples, the outlet component 122, 132 includes a male fitting and the upper mounting location 112 includes a female fitting which receives the male fitting for connecting the mounting adapters 120, 130 to the mounting block 110. In other examples, the outlet component 122, 132 includes a female fitting and the upper mounting location 112 includes a male fitting. Other connection arrangements can be used. The outlet components 122, 132 can have a similar physical characteristic (e.g., the same or similar physical configuration, one or more same or similar dimensions, the same or similar shape profile, designs, features, or the like) to facilitate interchangeability or coupling of the mounting adapters 120, 130 to the mounting block 110.

Lower portions of the mounting adapters 120, 130 can have a similar physical characteristic (e.g., same or similar dimensions, shape profiles, designs, features, and/or physical configurations) that securely couples (e.g., mates, connects, mounts, fits, attaches, combines, unifies, or the like) the mounting adapters 120, 130 to the mounting block 110. The upper location 112 of the mounting block 110 can have a corresponding (e.g., complementary, paired, mated, connectable, mountable, inter-fitting, attachable, combinable, unifiable, related, similar, or the like) configuration for interchangeable coupling with the mounting adapters 120, 130. For instance, the mounting adapters 120, 130 can each include a key. The mounting block 110 can include a keyway. The keyway of the mounting block 110 can correspond with the key of the mounting adapters 120, 130. For instance, the keyway of the mounting block 110 can (individually) receive the key of the mounting adapters 120, 130. The reception of the key of the mounting adapters 120, 130 by the keyway of the mounting block 110 can securely fit the mounting adapters 120, 130 to the mounting block 110. In another example, the mounting block 110 and the mounting adapters 120, 130 include one or more of a plug, protrusion, extrusion, boss, hole, recess, socket, receptacle, or the like to facilitate interchangeable coupling of the mounting adapters 120, 130 with the mounting block 110. Accordingly, a user can disconnect the multifunctional nozzle assembly system 100 from one type of vehicle (e.g., a sprayer) and reconnect the multifunctional nozzle system 100 to a different type of vehicle (e.g., a planter) by swapping out one or more of the mounting adapters 120, 130 or a nozzle body while re-using the universal mounting block 110.

Each of the interchangeable mounting adapters 120, 130 further includes an input component 124, 134 for connecting to a liquid system of a respective vehicle type. For example, mounting adapter 120 includes an input component 124 that is configured for connecting to the liquid system of a sprayer and mounting adapter 130 includes an input component 134 that is configured for connecting a liquid system of a planter. The input components 124, 134 can be the same, but are typically different from each other with mechanical configurations (e.g., tubing size, connectors) that match the respective vehicle for which the mounting adapter 120, 130 is used. The input components 124, 134 can utilize quick-connect style fittings, threaded fittings, or other suitable connection mechanisms, sized to connect to standard agricultural sprayer or planter tubing. For example, the input components 124, 134 can clamp over a boom tube.

Each of the interchangeable mounting adapters 120, 130 can further include mounting hardware 126, 136 for mounting the adapter 120, 130 to its respective vehicle type. For example, mounting hardware 126 can include a circular fitting 127 for mounting to a boom line of a sprayer. Mounting hardware 136 can, for example, include a plate 137 for fastening to a part of a planter.

The system 100 further includes one or more interchangeable nozzle bodies 140, 150 configured for coupling with the lower mounting location 114 of the mounting block 110. Each interchangeable nozzle body 140, 150 includes an input fitting 142, 152 for coupling to the lower mounting location 114. In some examples, a quick connect fitting or push to connect fitting can be used. In one example, input fitting 142, 152 includes a male fitting and the lower mounting location 114 includes a female fitting which receives the male fitting for connecting the components. In other examples, the input fitting 142, 152 includes a female fitting and the lower mounting location 114 includes a male fitting. Other connection arrangements can be used. The input fittings 142, 152 can be similar in order to facilitate interchangeability of the nozzle bodies 140, 150 with the mounting block 110.

The upper portions of the nozzle bodies 140, 150 can have a similar physical characteristic (e.g., the same or similar shape profiles, dimensions, physical configurations, designs, features, or the like) that securely couple the nozzle bodies 140, 150 with the mounting block 110. Similarly, the lower mounting location 114 of the mounting block 110 can have a physical configuration for interchangeable coupling with the nozzle bodies 140, 150.

Each interchangeable nozzle body 140, 150 further includes a nozzle base 144, 154 and a shuttle 146, 156 for modulating flow rate through the nozzle base 144, 154. When installed on the mounting block 110, the shuttle 146, 156 can engage the operator 116 to modulate the flow rate through the respective nozzle body 140, 150. The operator 116 can, for example, be a stepper motor, servo motor, hydraulic actuator, or the like. In some examples, the shuttle 146 operates to vary the size of an orifice opening 148 of a nozzle base 144. In some examples, the shuttle 156 operates as an on/off valve to turn on and off the flow of fluid through an orifice opening 158 of the nozzle base 154. The shuttle 146, 156 can be a sliding plate, a plunger, or other shape suitable for modulating flow through the nozzle body 140, 150 (e.g., increasing or decreasing flow rate, or shutting off flow). Additional example nozzle bodies, shuttles, and operators are illustrated in, for example, FIGS. 5A, 5B, 6A, and 6B.

In some examples, the mounting block 110 includes a first section 160 housing the operator 116 (e.g., stepper motor) and controller 117 (e.g., motor controller) and a second section 162, extending from the first section 160, where the upper and lower mounting locations 112, 114 are disposed. The second section 162 can be a finger or flange extending from the first section 160. The upper and lower mounting locations 112, 114 can be positioned at the second section 162, opposite one another. While this positioning is not necessary, it can reduce or eliminate the need for fluid pathways (or conduits) in the mounting block 110 for connecting the outlet components 122, 132 of the mounting adapter 120, 130 to the input fitting 142, 152 of the nozzle body.

In some examples, the universal mounting block 110 includes a flow meter 118 coupled with (e.g., in, near, or adjacent) a fluid pathway between the between the upper and lower mounting locations 112, 114. The mounting block 110 includes a communications port 180 for coupling to a CAN bus (not shown) and to one or more electronic control units (ECUs) that can provide commands to the controller 117 and receive feedback from the motor controller 117 and flow meter 118. The communications port 180 may be located on a back side of the mounting block section 160, though other positions can be used. The flow meter 118 and controller 117 can be communicatively coupled to one another and/or to the communications port 180.

Figure 7:
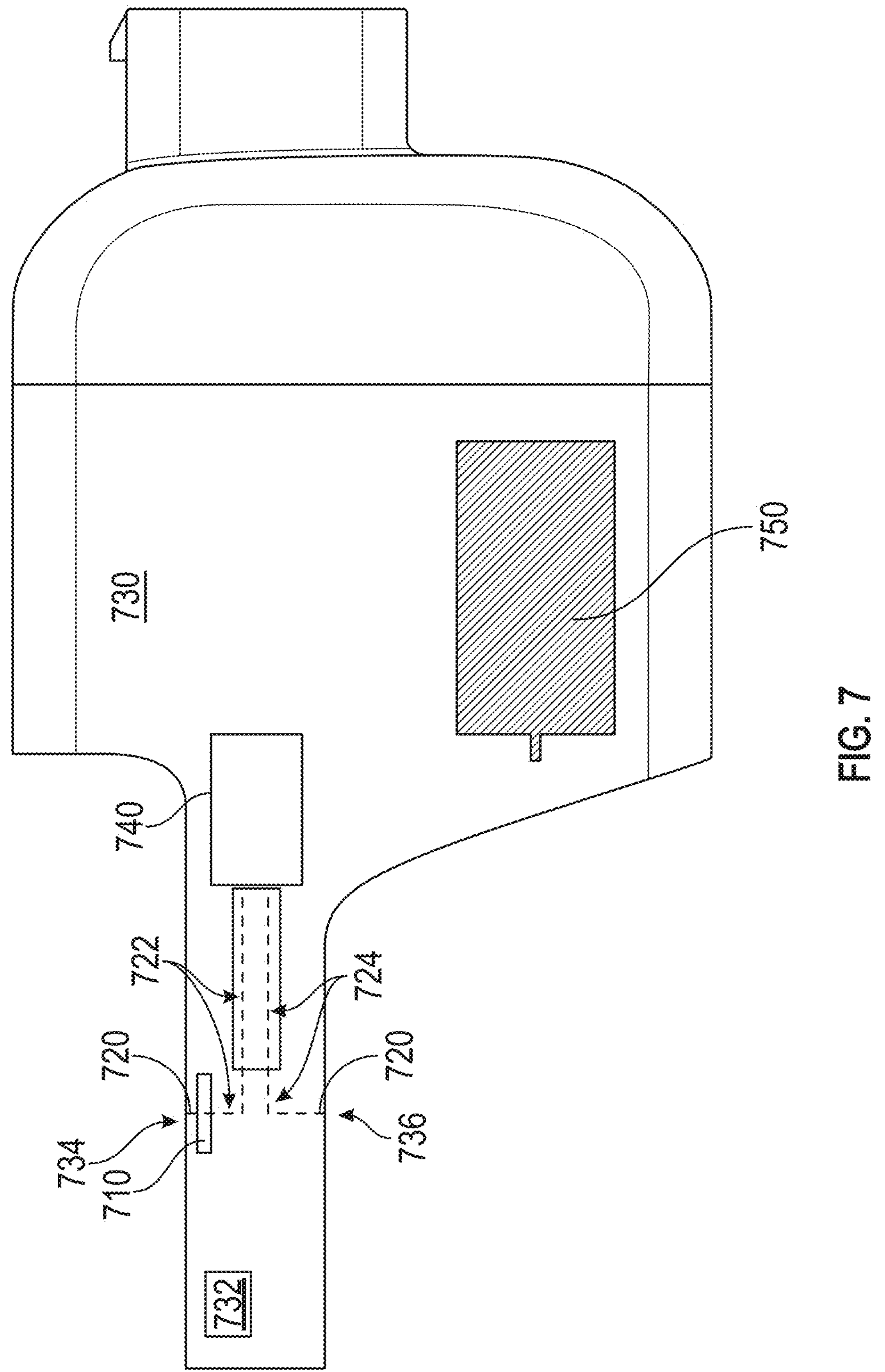
FIG. 7 illustrates an example mounting block with a flow meter according to embodiments of the present subject matter.

The flow meter 118 can, for example, be an electromagnetic flow meter (e.g., a magmeter) located in line with the fluid pathway or a turbine flow meter having a rotor in the fluid pathway. In another example, the flow meter 118 can be a load cell. FIG. 7 illustrates an example mounting block 730 having a flow meter 710. The flow meter 710 (e.g., magmeter, turbine flow meter, load cell, etc.) can measure fluid flow in a fluid path 720 from an upper mounting location 734 for a mounting adapter through an extending section 732 of a mounting block 730 to a lower mounting location 736 for a nozzle body.

In some examples, a nozzle base (e.g., nozzle base 144) for a first interchangeable nozzle body (e.g., body 140) is for use with a sprayer and a nozzle base (e.g., nozzle base 154) for a second interchangeable nozzle body (e.g., body 150) is for use with a planter. In some examples, the controller 117 variably controls a shuttle (e.g., shuttle 146 vs shuttle 156) to variably control the first interchangeable nozzle body in a different manner than the second interchangeable nozzle body.

Figure 2A:
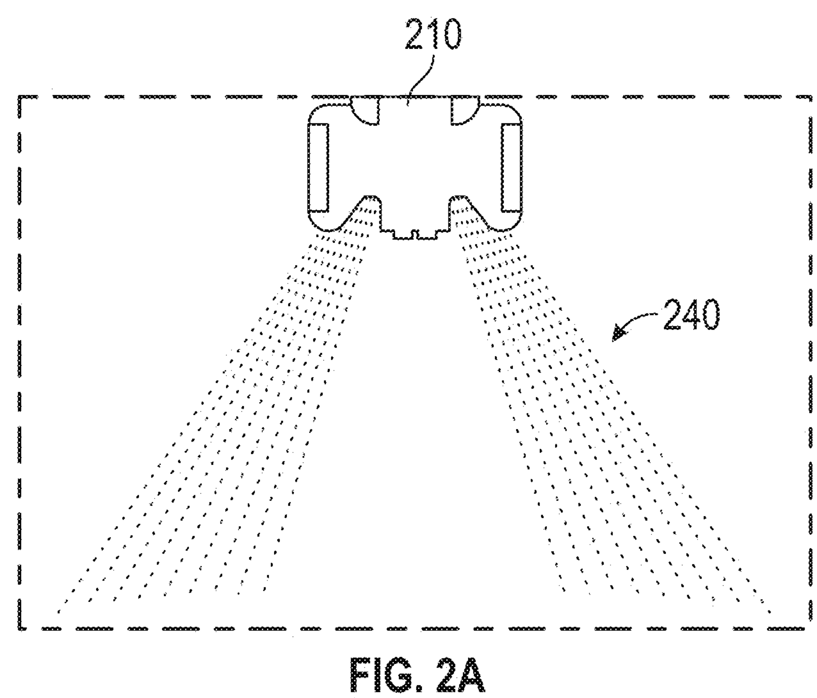
FIGS. 2A-2C illustrate example nozzle attachments according to embodiments of the present subject matter.
Figure 2B:
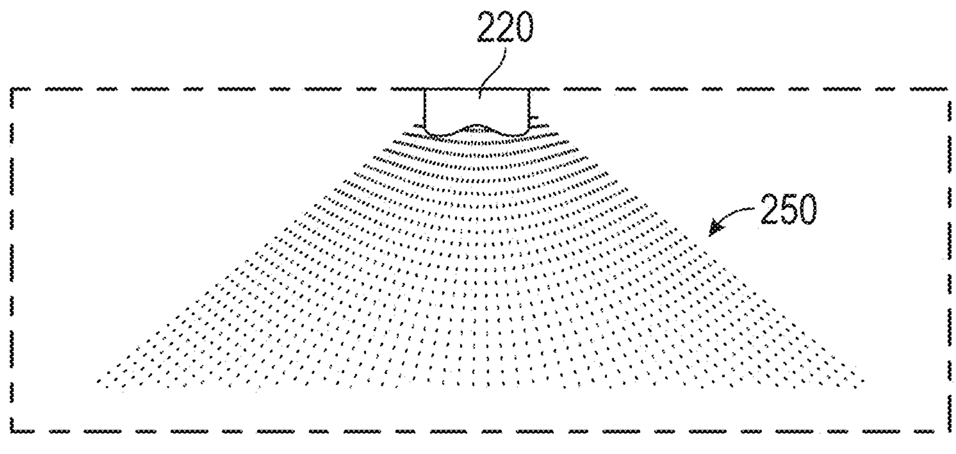
Figure 2C:
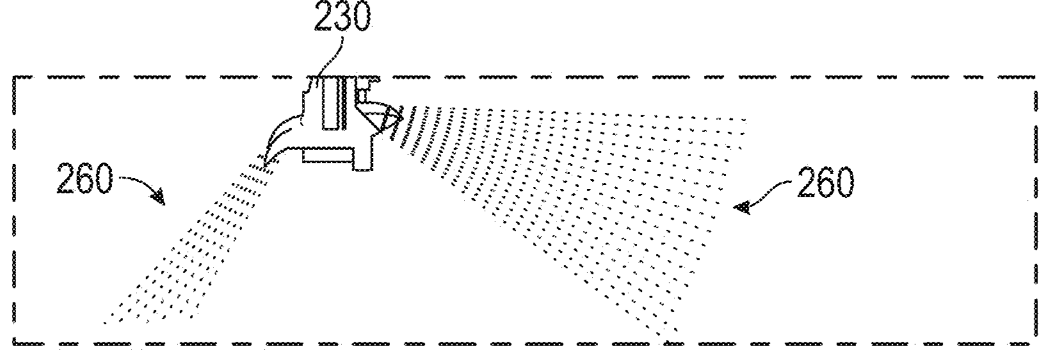

In some examples, a nozzle base (e.g., nozzle base 144) of the first interchangeable nozzle body (e.g., body 140) for a sprayer includes a connecting element 149 for connecting to different types of nozzle attachments having different spray patterns or droplet sizing. Various nozzle attachments 210, 220, 230 that can be connected to the connecting element 149 are shown in FIGS. 2A-2C.

In some examples, a nozzle base (e.g., nozzle base 154) of the second interchangeable nozzle body (e.g., body 140) for a planter includes a connecting element 159 for connecting to different types of nozzle attachments having different sized fixed openings. In other examples, the nozzle base does not include a connecting element 149, 159 but rather each interchangeable nozzle base has a different size, fixed opening.

The multifunctional nozzle assembly system 100 can be provided as one or more assembly kits. Each assembly kit can, for example, include one or more mounting adapters for a specific vehicle type (e.g., sprayer or planter) and one or more matching (paired) interchangeable nozzle bodies for the specific vehicle type. In some examples, a primary kit can also include a mounting block, or a mounting block can be provided separately from a kit having a mounting adapter/nozzle body (or bodies).

In some examples, the multifunctional nozzle assembly system 100 can further include an attachment mechanism (e.g., a screw, a bolt, a snap-fit lock, and the like) for securing a mounting adapter 120, 130 to the mounting block 110. For example, the system 100 can include a threaded screw or bolt that can be threaded through a hole in the mounting adapter 120, 130 and into a threaded hole in the mounting block 110. In some examples, the multifunctional nozzle assembly system 100 can further include an attachment mechanism (e.g., a screw, a bolt, a snap-fit lock, and the like) for securing a nozzle body 140, 150 to the mounting block 110. For example, the system 100 can include a threaded screw or bolt that can be threaded through a hole in the nozzle body 140, 150 and into a threaded hole in the mounting block 110. In some examples, the various components of the system 100 can be constructed from plastic, metal, and/or ceramic materials.

FIGS. 2A-2C illustrate example nozzle attachments according to embodiments of the present subject matter. For instance, a first nozzle attachment 210 can be connected to the connecting element 149. The first nozzle attachment 210 can have a first fluid distribution 240. A second nozzle attachment 220 can be connected to the connecting element 149. The second nozzle attachment 220 can have a second fluid distribution 250. A third nozzle attachment 230 can be connected to the connecting element 149. The third nozzle attachment 230 can have a third fluid distribution 260. Accordingly, the nozzle attachments 210, 220, 230 provide different fluid distributions 240, 250, 260.

Figure 3:
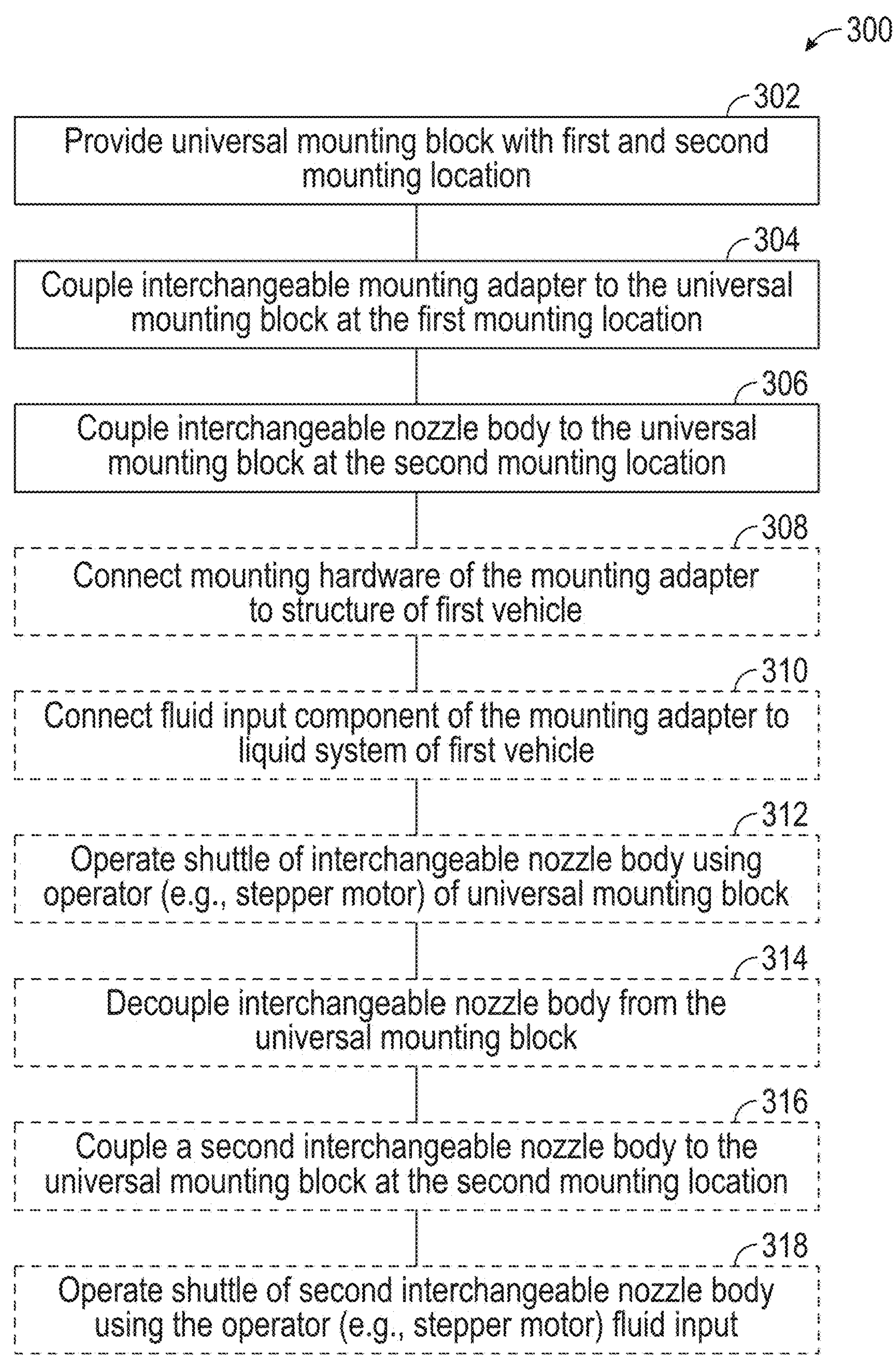
FIG. 3 illustrates an example assembly method according to embodiments of the present subject matter.

FIG. 3 illustrates an assembly method 300 for a nozzle assembly system in accordance with an example of the present subject matter. The method 300 includes providing a universal mounting block including a first mounting location and a second mounting location, at 302. The universal mounting block can include and operator and a controller such as a stepper motor and a motor controller. At 304, the method includes coupling a first interchangeable mounting adapter to the first mounting location of the mounting block. This can include inserting an output component such as a male fitting into a female fitting at the mounting location. This can further include securing the mounting adapter to the universal mounting block with the screw or another securing means. The first interchangeable mounting adapter can be configured for use with a first vehicle type such as a sprayer or planter.

At 306, the method includes coupling a first interchangeable nozzle body to the second mounting location of the mounting block. This can include inserting a male input fitting of the nozzle body into a female receptacle of the universal mounting block. The first interchangeable nozzle body is configured for use with the first vehicle type. In some examples, the mounting adapter and nozzle body and optionally the mounting block are provided as a kit for a particular type of vehicle such as a sprayer or planter. As should be appreciated, the order of operations of method 300 can vary.

In some examples, the method 300 can further include connecting mounting hardware of the first interchangeable mounting adapter structure of the first vehicle, as shown at block 308. For example, the mounting adapter can include a circular fitting for connecting to a sprayer boom or a plate for connecting to a planter. The method can further include connecting an input component of the first interchangeable mounting adapter to a liquid system of the first vehicle as shown at block 310.

The method 300 can further include operating a shuttle of the interchangeable nozzle body using an operator (e.g., stepper motor) of the universal mounting block, as shown at 312. The shuttle of the nozzle body and operator of the universal mounting block can be automatically aligned for operation as part of the connection of the nozzle body to the mounting block as shown at block 308. Operation of the shuttle modulates flow rate through the nozzle body, for example, in a variable and/or on/off manner. The method 300 can in some examples further include connecting a nozzle attachment to a nozzle base of the first interchangeable nozzle body.

In some examples, the method 300 can include decoupling the interchangeable nozzle body from the mounting block, as shown at 314. This can include unfastening the attachment mechanism and pulling out the nozzle body from the mounting block. The method 300 can include coupling a second interchangeable nozzle body to the mounting block, as shown at 316.

The second nozzle body can be different from the first nozzle body but still matched for usage with the same vehicle type. As shown at 318, the method 300 can include operating the shuttle of the second nozzle body using the operator (e.g., stepper motor) of the universal mounting block. Operation of the shuttle modulates flow rate through the nozzle body, for example, in a variable and/or on/off manner. In some examples, the operator may control the shuttle of the second nozzle body differently than the first nozzle body, for example, depending on the characteristics of the nozzle body (e.g., flow rate, orifice size, tubing size, desired spray pattern, etc.). In some examples, a user programs the controller for a desired operation of the shuttle. In other examples, the controller of the mounting block reads a chip or other indicator on the nozzle body to detect the type of nozzle body and configures itself with some or all operation parameters for operation (e.g., operating the shuttle) based on the type of nozzle body detected.

Figure 4:
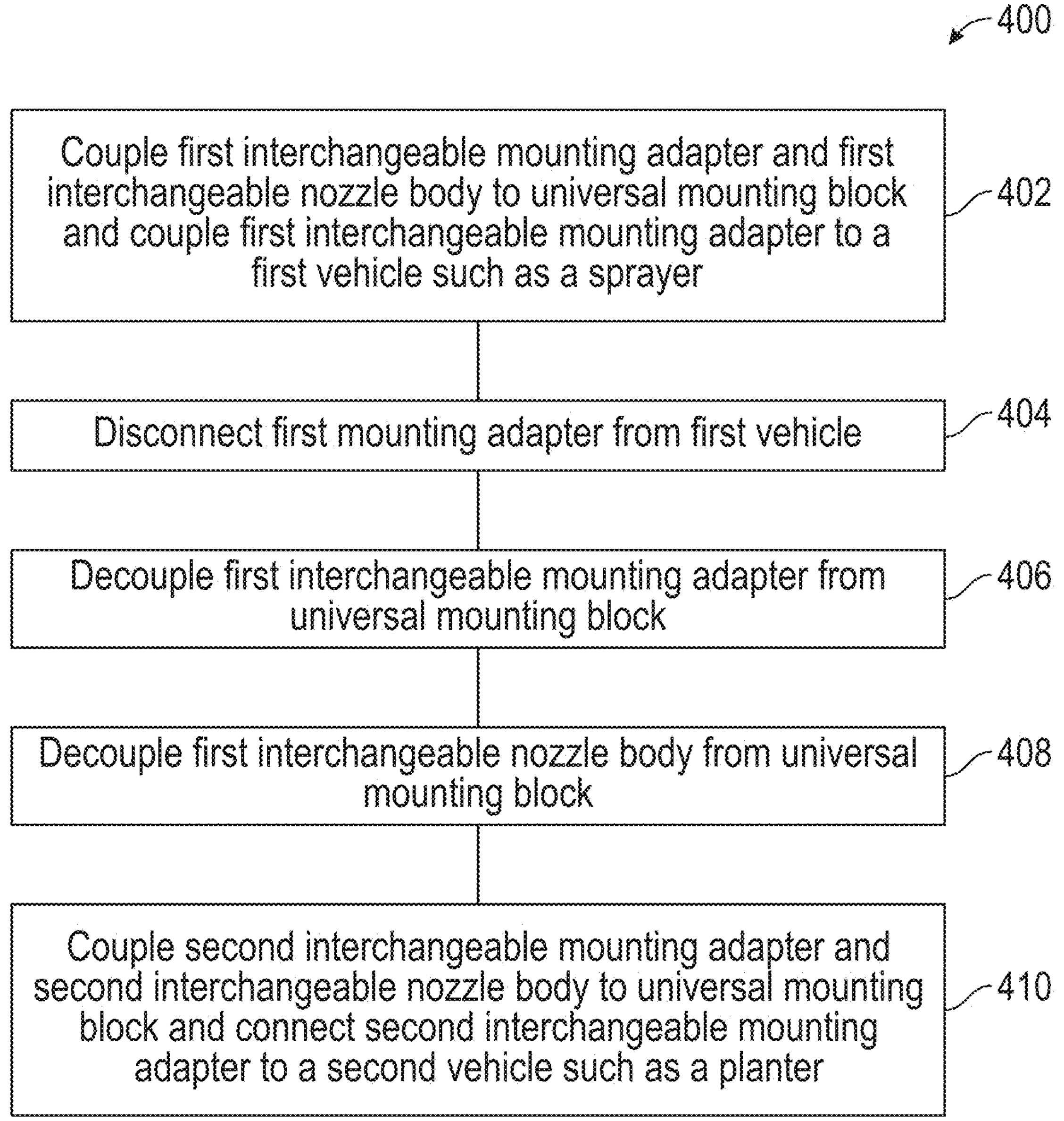
FIG. 4 illustrates an example assembly method according to embodiments of the present subject matter.

FIG. 4 illustrates an assembly method 400 for a nozzle assembly system in accordance with an example of the present subject matter. The method 400 illustrates a way to re-use a nozzle assembly system. The method 400 includes coupling a first interchangeable mounting adapter and first interchangeable nozzle body to a universal mounting block and connecting the first interchangeable mounting adapter to a first vehicle such as a sprayer. This may be performed in accordance with method 300, for example. The order of the connections can vary.

The method 400 further includes decoupling the first interchangeable mounting adapter from the first vehicle, as shown at 404. At 406 and 408, the method 400 includes decoupling the first interchangeable nozzle body and first interchangeable mounting adapter from the universal mounting block. At block 410, the method includes connecting a second interchangeable mounting adapter and a second interchangeable nozzle body to the mounting block. The second interchangeable mounting adapter and the second interchangeable nozzle body can be configured for use with a second vehicle different than the first vehicle. As should be appreciated, the order of operations of method 400 can vary.

As mentioned earlier, by providing multifunctional nozzle assembly systems, the present subject matter can provide one or more of the following advantages. The present subject matter can allow for nozzle assemblies to be more efficiently made. For example, the present subject matter avoids the need to provide a dedicated component with expensive hardware (e.g., motor, motor controller, flow meter) for spray systems for different types of vehicles. Instead, the present subject matter provides a universal mounting block that can operate with less expensive adapters and nozzle bodies for different vehicles. The present systems can be more efficiently used and re-used. For example, a user can disconnect a multifunctional nozzle assembly system from one type of vehicle (e.g., a sprayer) and reconnect a multifunctional nozzle system to a different type of vehicle (e.g., a planter) by swapping out the mounting adapter and nozzle body while re-using the universal mounting block. These and other advantages can be provided by the system and methods described herein.

Figure 5A:
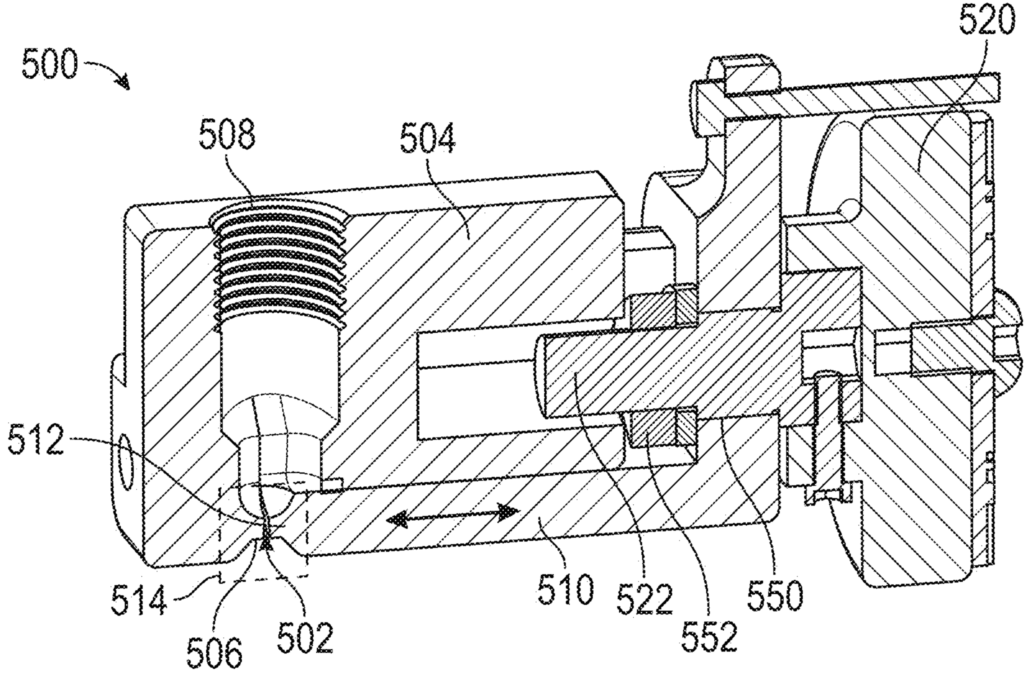
FIGS. 5A and 5B illustrate an example nozzle body and operator according to embodiments of the present subject matter.
Figure 5B:
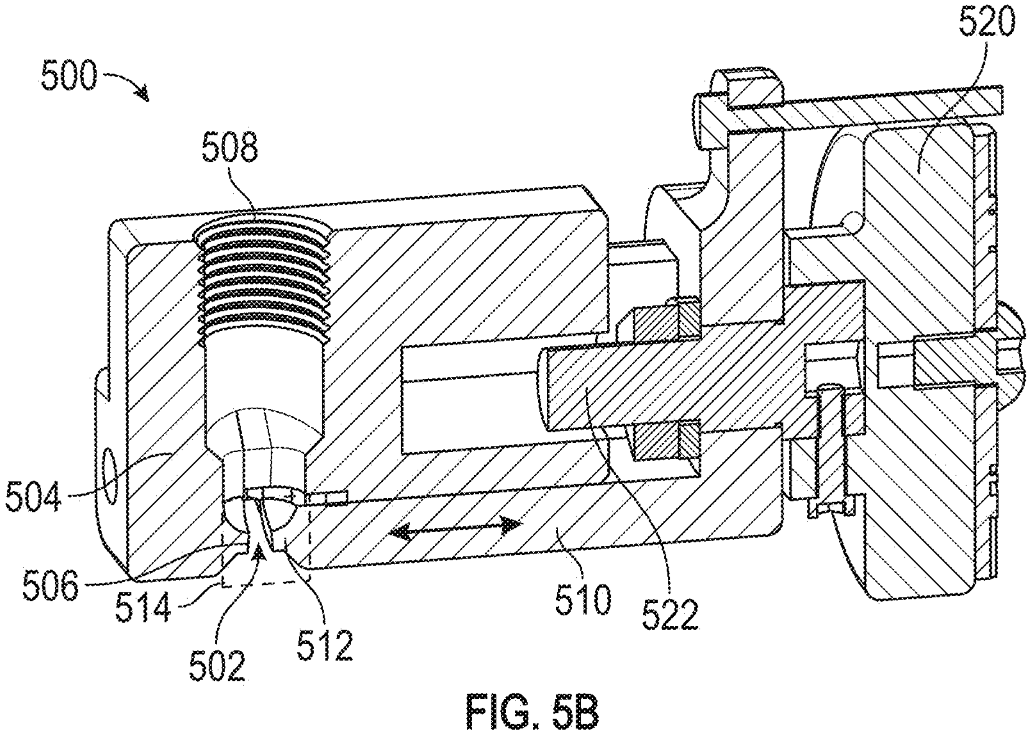

Referring now to FIGS. 5A and 5B, the modulating nozzle assembly 500 is shown in respective first and second open configurations illustrating the spray port 502 with respectively different first and second spray port profiles. Referring first to FIG. 5A, the spray port 502 has a first (open) spray port profile shown with the spray modulating element 510 (in this example a shuttle) having the shuttle edge 512 proximate to the base edge 506 of the nozzle base 504. In this example of the first open configuration, the modulating nozzle assembly 500 and its spray port having the illustrated first spray port profile generates smaller spray droplet sizes than the second open configuration (with pressure and flow rate remaining the same or similar).

As shown in FIG. 5B, the spray modulating element 510 is in a second open configuration relative to FIG. 5B. For instance, the shuttle modulating element 510 and its shuttle edge 512 are retracted from the base edge 506 of the nozzle base 504. The second (open) spray port profile of the spray port 502 is accordingly expanded (larger) and the spray droplets generated from the spray port 502 have smaller droplet sizes than in the first open configuration (with pressure and flow rate remaining the same or similar). In other examples, with variations in one or more of pressure, flow rate, specified droplet size or the like the spray port 502 is expanded or contracted with the spray modulating element 510 to provide the specified droplet size while also delivery the agricultural product at the specified flow rate and pressure. The modulating nozzle assembly 500 controls the spray port profile of the spray port 502 to accommodate various flow rates, pressures or the like of the agricultural product while at the same time spraying the agricultural product at a specified droplet size (including range of sizes). In other examples, the spray modulating element 510 is movable to one or more of a closed spray port profile, for instance with the base edge 506 and shuttle edge 512 engaged (or engaged with a gasket), or intermediate spray port profiles (e.g., between fully open and closed).

Positioning of the shuttle edge 512 relative to the base edge 506 for the first spray port profile of the spray port 502 achieved with movement of one or more spray modulating elements 510 to position the associated shuttle edges 512 relative to the base edge 506. In the example shown in FIG. 5A a single spray modulating element 510 is illustrated. In other examples, opposed spray modulating elements 510 having associated shuttled edges 512 are optionally moved relative to each other (e.g., toward or away).

The operator 520 coupled with the modulation actuator 522 that is coupled with the spray modulating element 510 controls movement (including maintenance of position) of the element 510 and its shuttle edge 512. As discussed herein, the operator 502 includes one or more of a knob, dial, motor or the like (e.g., manual or automated operators). In an example including a motor operator 502, such as a stepper or servo motor, hydraulic actuator, pneumatic actuator or the like, the operator 502 is in communication with a control system, such as the nozzle controller 904 shown in FIG. 9 (or 122 shown in FIG. 1). The nozzle controller 904 provides control instructions to the operator 502 to accordingly conduct one or more of movement, maintenance of position or the like that positions the shuttle edge 512 relative to the base edge 506 and thereby controls the spray port profile of the spray port 502.

In the example shown in FIGS. 5A, 5B, the operator 502 is interconnected with the spray modulating element 510 with a modulation actuator 522 configured to translate movement of the operator 502 to movement of the spray modulating element 510. As discussed herein, the modulation actuator 522 includes one or more shafts, fittings, mechanisms or the like, such as a screw drive, worm drive, piston, rack and pinion, multi-bar linkage or the like configured to control the position of the spray modulating element 510. In the example shown in FIGS. 5A, 5B the modulation actuator 522 includes a shaft coupled with the operator 520, and rotation of the operator 520 accordingly rotates the shaft.

In an example, the spray modulating element 510 includes one or more features complementary to the shaft. For instance, the modulation actuator 522 (a shaft in this example) is threaded and the spray modulating element 510 includes complementary threading. As the modulation actuator 522 is rotated the spray modulating element 510 (shuttle in this example) is translated according to the interfit threading of the actuator 522 and the element 510. Rotation of the actuator 522 in an opposed direction accordingly translates the spray modulating element 510 in an opposed direction. With the actuator 522 in a static configuration (e.g., not rotated, passively or actively held static or the like) the interfit threading holds the spray modulating element 510 in its present position and accordingly maintains the spray port 502 (formed by the shuttle edge 512 and the base edge 506) at its present spray port profile, such as size or shape. Optionally, the spray modulating element 510 includes threading along a shuttle passage 550 extending through the element 510. The modulation actuator 522 includes the complementary threading coupled with the threading of the element 510. In another example, the spray modulating element 510 includes a transmission feature 552, such as a nut, lug or the like, having the threading, and the feature is coupled with the modulating element 510. Translation of the transmission feature 552 (e.g., through rotation of the modulation actuator 522) is transmitted to the spray modulating element 510 to correspondingly move the element 510 and its shuttle edge 512 relative to the nozzle base 504 and its base edge 506.

Figure 6A:
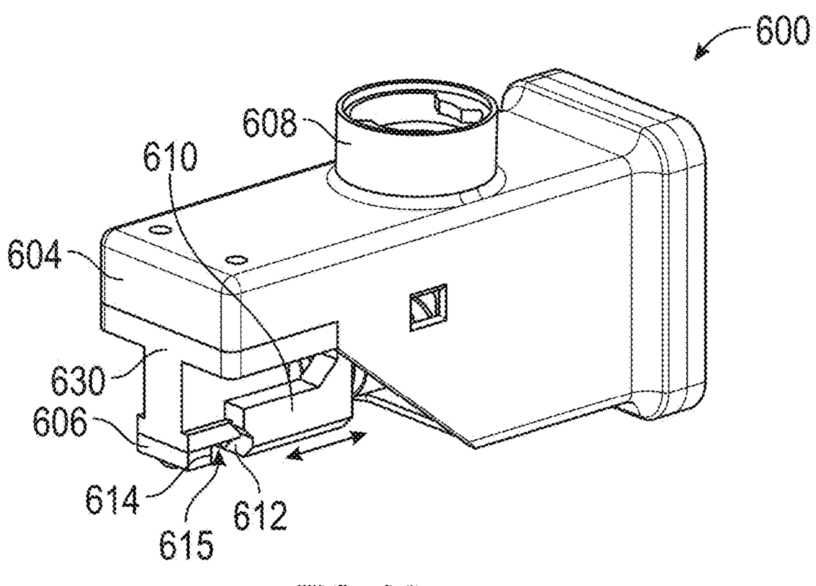
FIGS. 6A and 6B illustrate an example nozzle body and operator according to embodiments of the present subject matter.
Figure 6B:
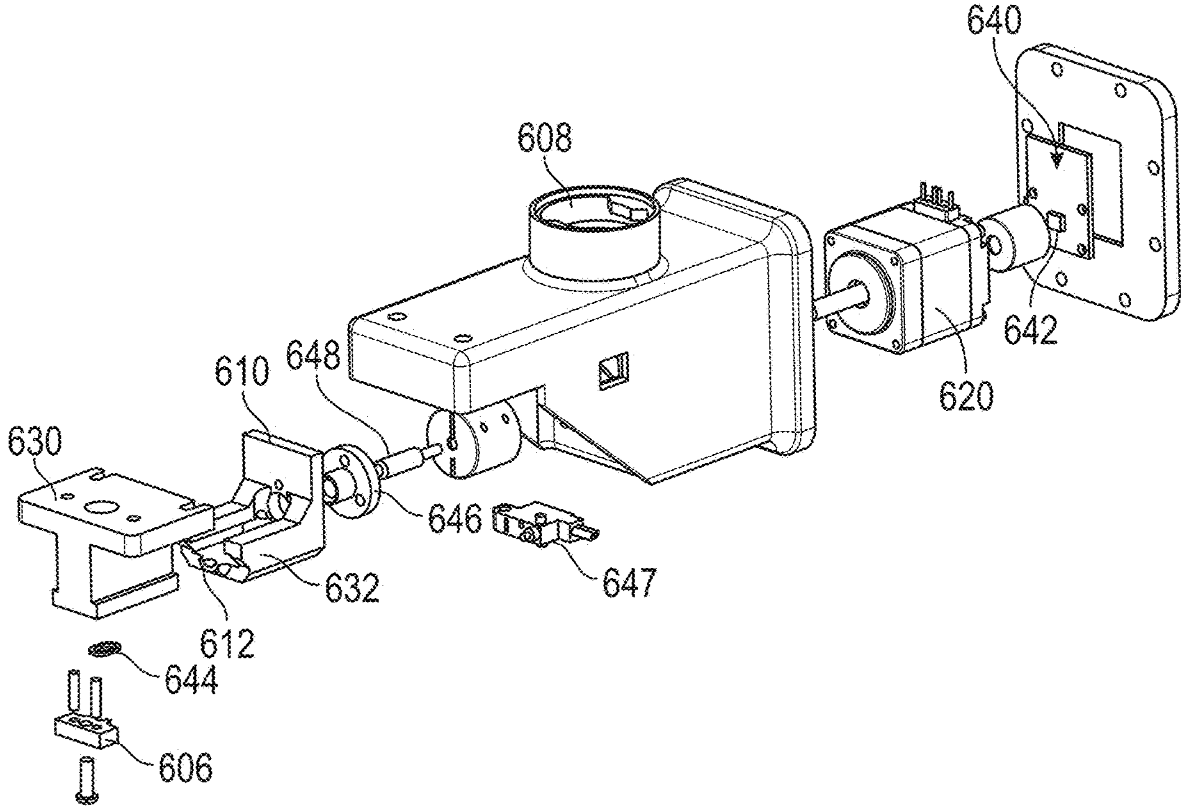

FIGS. 6A and 6B are respectively perspective and exploded views of another example of a modulating nozzle assembly 600 including an operator 620, such as a stepper motor, servo motor, hydraulic actuator, pneumatic actuator or the like. Optionally the operator 620 includes a transmission (e.g., a worm transmission or the like) to vary the orientation of the operator 620, step up power, or step down power. Additionally, the example modulating nozzle assembly includes a nozzle controller 640, such as an electronic control unit (ECU), processor, processor on a board or the like interconnected with the operator 620 to permit automated control of the spray port profile. The nozzle controller 640 is interconnected with the operator 620 to permit automated control of the spray port profile of the spray port 615. A position sensor 642 is optionally provided with the assembly 600. In the example shown in FIG. 6B the position sensor 642 is interposed between the nozzle controller 640 and the operator 620. The position sensor 642 includes, but is not limited to, a magnetic encoder, optical encoder or the like that counts or measures rotation of the operator 620 and thereby determines the position of the spray modulating element 610 and the corresponding modulating port profile. In another example, a limit switch 647 is included, and permits calibration of the spray modulating element 610 and the associated modulating port profile. For instance, an initial position of the spray modulating element 610 is readily determined with a specified actuation at machine startup and detection of element 610 position during that specified actuation with the limit switch 647 (e.g., detection by the limit switch indexes a fully open or fully closed position for the element 610).

In an example, the modulating nozzle assembly 600 includes a nozzle base 604 and one or more input fittings 608. A spray modulating element 610, such as a shuttle (e.g., block, plate, shuttle or the like) is movably coupled with the nozzle base 604. Each of the spray modulating element 610 and the nozzle base 604 include respective shuttle and base edges 612, 606. The base edge 606 and the shuttle edge 612 form at least a portion of the perimeter of the spray port 615. Accordingly, movement of one or both of the base edge 606 or shuttle edge 612 relative to the other edge controls the spray port profile (e.g., size or shape of the spray port 615).

The modulating nozzle assembly 600 further includes a guide rail 630 movably coupled with a rail follower 632 of the spray modulating element 610. In the example shown in FIG. 6B, the guide rail 630 is separable component of the remainder of the nozzle base 640, for instance to permit replacement of one or more of the rail 630, the associated base edge 606 or the like. In another example, the guide rail 630 is an integral component to the nozzle base 640. The rail follower 632 of the spray modulating element 610 includes one or more of a complementary recess, groove or the like coupled with the guide rail 630. The rail follower 632 and guide rail 630 in combination guide movement of the spray modulating element 610, for instance between various open, closed and intermediate spray port profiles.

In the example assembly 600 shown in FIG. 6B, the base edge 606 is a replaceable component of the nozzle base 604. For instance, the base edge 606 is a fitting, insert or the like configured for coupling with the remainder of the nozzle base 604, such as guide rail 630. The base edge 606 is replaceable (along with the spray modulating element) to address wear, failure or the like without requiring replacement of the entire modulating nozzle assembly 600. In another example, the base edge 606 is integral to the guide rail 630 and both are replaced at the same time.

Referring again to FIG. 6B, an actuator 648 is coupled with the operator 620. The actuator 648 is, in this example, a shaft that transmits rotation from the operator 620 to the spray modulating element 610 to thereby translate the spray modulating element 610. The spray modulating element 610 includes a complementary fitting (e.g., threading) or a transmission feature 646, such as a nut, lug or the like, having threading. The threading of either or both of the element 610 or the transmission feature 646 are interfit with complementary threading of the actuator 648. Accordingly, rotation of the actuator 648 (e.g., conducted by the operator 620) causes translation of the spray modulating element 610.

In another example, the modulating nozzle assembly 600 includes a translation gasket 644. As shown in FIG. 6B, the translation gasket 644 is installed in the base rail 630 and surrounds the input passage 650 extending to the spray port 615. The translation gasket 644 bridges a gap between the nozzle base 604 and the spray modulating element 610 and decreases leaking from between the base 604 and element 610, and instead ensures flow of the agricultural product to the spray port 615. The translation gasket 644 bridging the gap provides a snug sliding interface between the nozzle base 604 and the spray modulating element 610.

FIG. 7 illustrates an example mounting block 730 having a flow meter 710. The flow meter 710 (e.g., magmeter, turbine flow meter, load cell, etc.) can measure fluid flow in a fluid path 720 from an upper mounting location 734 for a mounting adapter through an extending section 732 of a mounting block 730 to a lower mounting location 736 for a nozzle body.

In another example, the mounting block 730 optionally includes a solenoid valve 740. The solenoid valve 740 permits (or inhibits) flow through the fluid path 720. For example, the solenoid valve 740 permits flow from the upper mounting location 734 for a mounting adapter to a lower mounting location 736 for a nozzle body. In another example, the solenoid valve 740 inhibits flow through the fluid path 720 to inhibit flow through an orifice opening of a nozzle base 144, for example the orifice opening 148 of the nozzle base 144 or the orifice opening 158 of the nozzle base 154 (shown in FIG. 1). For instance, the solenoid valve 740 may inhibit flow from the mounting block 730 to the nozzle base 144, 154.

In another example, the fluid path 720 can include a first section 722 and a second section 724. For example, the first section 722 of the fluid path 720 can extend between the upper mounting location 734 and the solenoid valve 740. Accordingly, fluid can flow from the upper mounting location 734 to the solenoid valve 740. The second section 724 of the fluid path 720 can extend between the solenoid valve 740 and the lower mounting location 736. The solenoid valve 740 can modulate flow through the fluid path 720, for instance by changing a flow rate of fluid through the fluid path 720. In an example, the solenoid valve 740 modulates flow between full flow and a cessation of flow through the fluid path 720 (and flow rates therebetween).

In yet another example, the solenoid valve 740 modulates flow through the fluid path 720 at a faster rate than an operator can actuate a shuttle. For instance, the solenoid valve can transition between full flow and a cessation of flow through the fluid path 720 within a first time period. An operator can actuate a shuttle within a second time period. The first time period can be less than the second time period. Accordingly, the solenoid valve 740 can modulate flow through the fluid path 720 in less time than the operator can actuate the shuttle. Thus, the solenoid valve 740 enhances precision and accuracy in transitioning between full flow and a cessation of flow within the fluid path 720. As a result, the solenoid valve can enhance performance of a multifunctional nozzle assembly system, for example by enhancing the accuracy and precision of applying an agricultural product using the multifunctional nozzle assembly system.

Referring to FIG. 7, the mounting block 730 can include an operator 750. The operator 750 can include one or more of a stepper motor, servo motor, hydraulic actuator, or the like. The operator 750 is capable of interfacing with a shuttle of an interchangeable nozzle body, for example to modulate the flow rate through a nozzle base. For instance, the mounting block 730 can include the operator 750 positioned proximate the lower mounting location 736. Accordingly, the operator 750 can interface with a shuttle of an interchangeable nozzle body coupled with the mounting block 730. Thus, the mounting block 730 can include one or more of the flow meter 710, the solenoid valve 740, or the operator 750.

Figure 8:
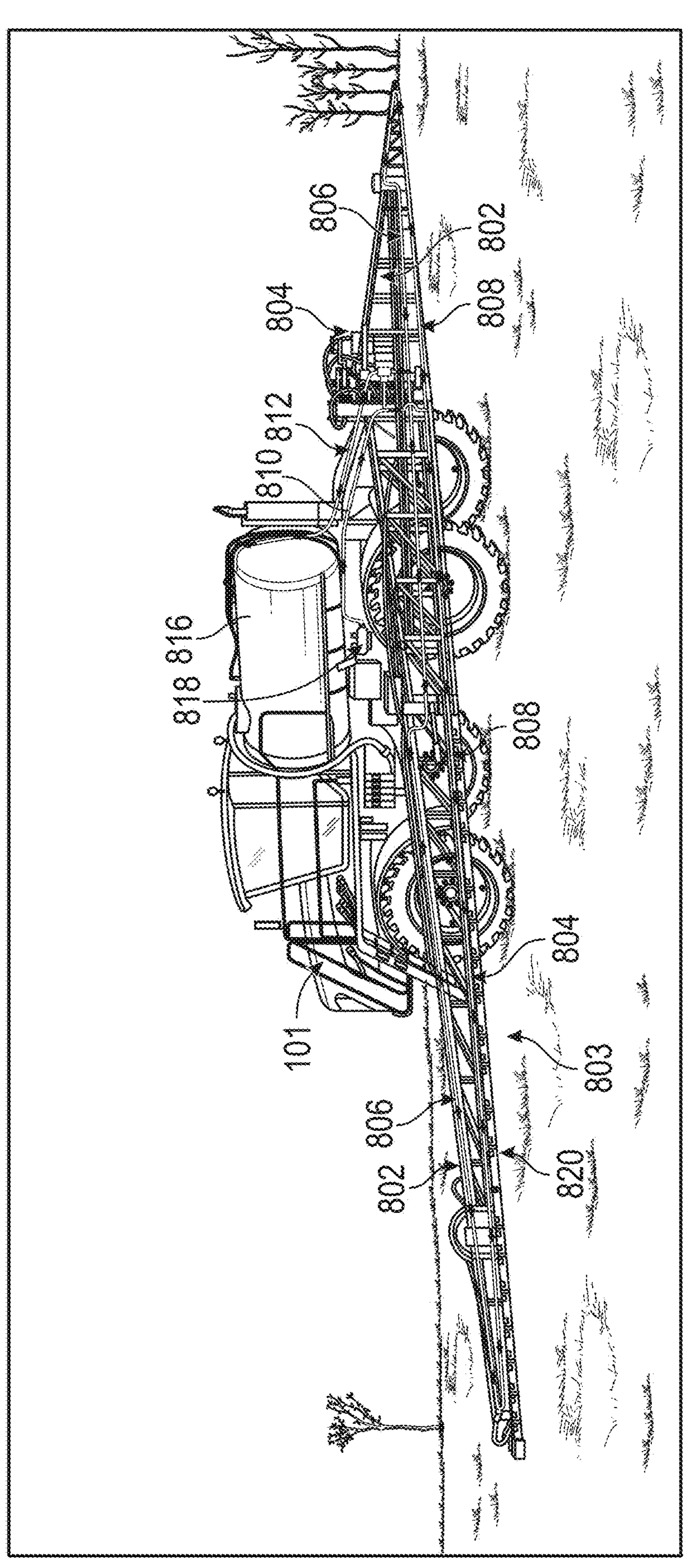
FIG. 8 is a perspective view of an example agricultural sprayer with a multifunctional nozzle assembly according to embodiments of the present subject matter.

FIG. 8 is a perspective view of one example of agricultural sprayer 800. The sprayer 800 includes a chassis 801 that carries a supply tank 816 of an agricultural solution including a carrier fluid and mixed agricultural product including, but not limited to, fertilizers, herbicides, pesticides or the like. Optionally, the supply tank 816 stores the carrier fluid, such as water, and a separate agricultural product reservoir (not shown) provides the agricultural product for metered administration to the carrier fluid prior to delivery to the sprayer booms 802.

The agricultural sprayer 800 includes a spraying system extending from the supply tank 816 to one or more multifunctional nozzle assemblies 820 along sprayer booms 802. Each multifunctional nozzle assembly 820 includes a mounting adapter for connecting to the sprayer boom tubes 804 and a spray nozzle for spraying the agricultural solution. Each multifunctional nozzle assembly 820 can be any one of the types discussed herein. The sprayer booms 802 extend from the chassis 801 and each include respective sprayer boom tubes 804. As shown in the schematic illustration overlaying the sprayer 800 the supply tank 816 includes a main line 810 and a system pump 818 along the main line 810. The main line 810 is in communication with the sprayer boom tubes 804. Operation of the system pump 818 delivers the mixed agricultural solution to the sprayer boom tubes 804 for delivery through one or more multifunctional nozzle assemblies 820.

Figure 9:
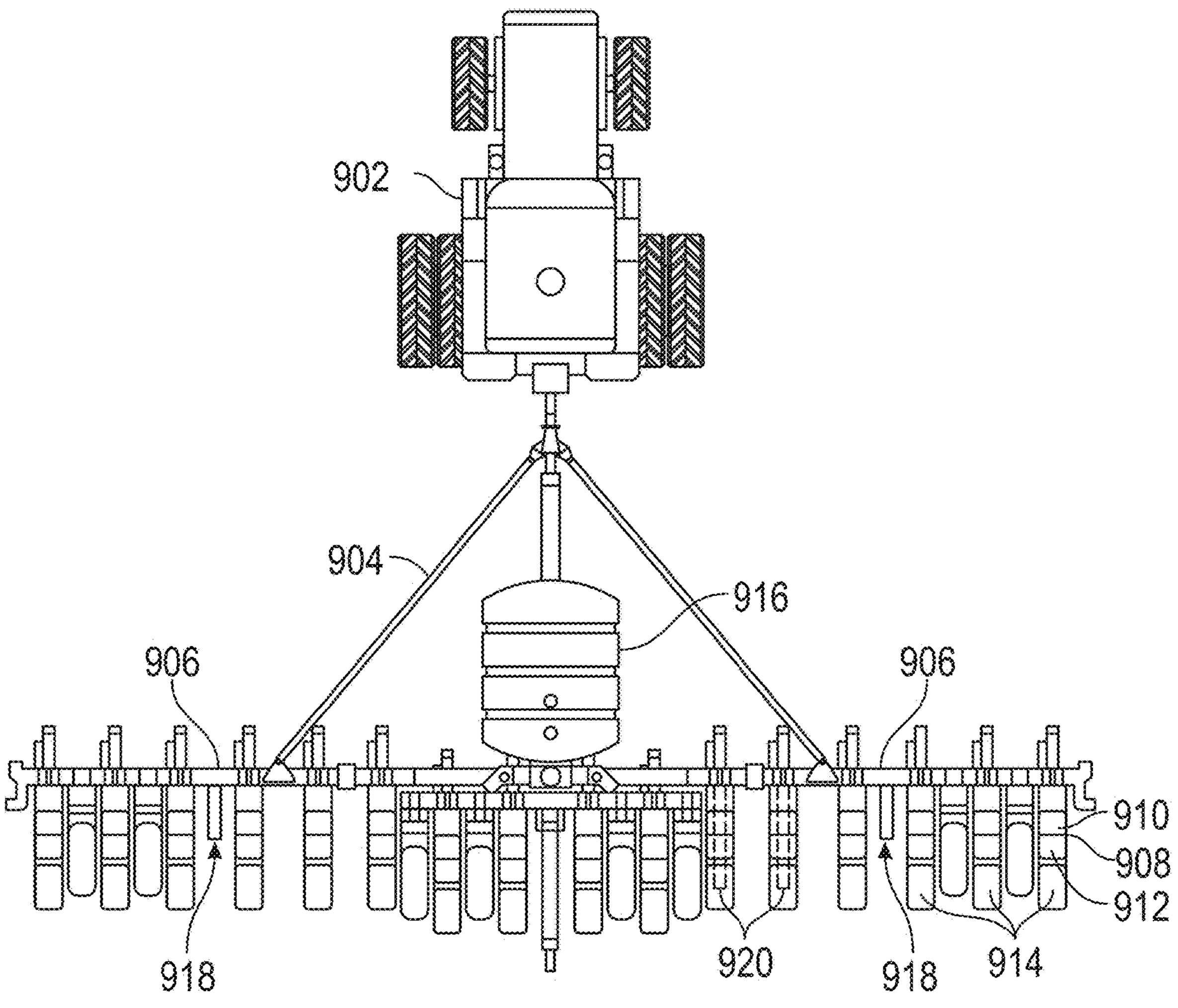
FIG. 9 is a schematic diagram of an example tractor and planter with a multifunctional nozzle assembly according to embodiments of the present subject matter.

FIG. 9 shows one example of a tractor 902 and a planter 904 (e.g., a multi-seed planter) having one or more multifunctional nozzle assemblies 918. Each multifunctional nozzle assembly 918 can be any one of the types discussed herein. The multi-seed planter 904 as shown can include a plurality of features configured to plant differing varieties of a seed or differing seeds. For instance, the multi-seed planter 904 can include a seed hopper 908 having first and second hoppers 910, 912. In the example shown in FIG. 9, each of the seed hoppers 908 is associated with one of a plurality of row units 914. The multi-seed planter 904 further includes one or more agricultural product reservoirs 916. For instance, in one example a liquid fertilizer or herbicide is provided in the agricultural product reservoir 916. In one example the agricultural product reservoir 916 is distributed throughout the row units 914 for instance to corresponding multifunctional nozzle assemblies 918 associated with each of the one or more row units 914 or associated with two or more row units 914. As shown in FIG. 9 each of the row units 914 can be positioned along corresponding booms 906 of the multi-seed planter 904. Each multifunctional nozzle assembly 918 can include a mounting adapter for mounting to a respective boom 906.

Various Notes & Aspects

Example 1 is a multifunctional nozzle assembly system, comprising: a universal mounting block including a first mounting location and a second mounting location; one or more interchangeable mounting adapters configured for coupling with the first mounting location, each of the interchangeable mounting adapters including an input component for connecting to a liquid system of a particular vehicle type and an outlet component for coupling to the mounting block; one or more interchangeable nozzle bodies configured for coupling with the second mounting location, each of the plurality of interchangeable nozzle bodies including an input fitting for coupling to the mounting block and a nozzle base and a shuttle for modulating flow rate through the nozzle base; wherein the universal mounting block further includes an operator and a control, the operator capable of interfacing with the shuttle of each of the one or more interchangeable nozzle bodies to modulate the flow rate through the respective nozzle body.

In Example 2, the subject matter of Example 1 optionally includes wherein the mounting block includes a first section housing the operator and controller and a second section extending from the first section, where in the second section includes the first mounting location and the second mounting location, wherein the first mounting location is positioned opposite of the second mounting location.

In Example 3, the subject matter of any one or more of Examples 1-2 optionally includes wherein the mounting block includes a flow meter positioned between the first mounting location and the second mounting location.

In Example 4, the subject matter of any one or more of Examples 1-3 optionally includes wherein the flow meter and operator are communicatively coupled to a CAN bus.

In Example 5, the subject matter of any one or more of Examples 1-4 optionally include wherein the mounting block includes a communications port for coupling to a CAN bus.

In Example 6, the subject matter of any one or more of Examples 1-5 optionally include wherein the one or more interchangeable mounting adapters includes: a first interchangeable mounting adapter having first mounting hardware for connecting to structure of a sprayer, wherein the input component of the first interchangeable mounting adapter is capable of connecting to the liquid system of the sprayer; and a second interchangeable mounting adapter having second mounting hardware for connecting to structure of a planter; wherein the input component of the second interchangeable mounting adapter is capable of connecting to the liquid system of the planter; wherein the output component of the first interchangeable mounting adapter and the output component of the second interchangeable mounting adapter have a similar physical characteristic so that the first interchangeable mounting adapter and the second interchangeable mounting adapter can be interchangeably coupled with the mounting block.

In Example 7, the subject matter of any one or more of Examples 1-6 optionally include wherein the one or more interchangeable nozzle bodies includes: a first interchangeable nozzle body having a first shuttle; and a second interchangeable nozzle body having a second shuttle; wherein the input fitting of the first interchangeable nozzle body and the input fitting of the second interchangeable nozzle body have a similar physical characteristic so that the first interchangeable nozzle body and the second interchangeable nozzle body can be interchangeably coupled with the mounting block; wherein the nozzle base of the first interchangeable nozzle body and the nozzle base of the second interchangeable nozzle body are different.

In Example 8, the subject matter of any one or more of Examples 1-7 optionally includes wherein the nozzle base for the first interchangeable nozzle body is for use with a sprayer and the nozzle base for the second interchangeable nozzle body is for use with a planter.

In Example 9, the subject matter of any one or more of Examples 1-8 optionally includes wherein the controller variably controls the first shuttle and the second shuttle to variably control the first interchangeable nozzle body in a different manner than the second interchangeable nozzle body.

In Example 10, the subject matter of any one or more of Examples 1-9 optionally include wherein the nozzle base of the first interchangeable nozzle body includes a connection element for connecting to different types of nozzle attachments having different spray patterns or droplet sizing.

In Example 11, the subject matter of any one or more of Examples 1-10 optionally include wherein the nozzle base of the second interchangeable nozzle body includes a connection element for connecting to different types of nozzle attachments having different sized fixed openings.

In Example 12, the subject matter of any one or more of Examples 1-11 optionally include one or more assembly kits, each assembly kit including a particular first mounting adapter for connecting to the liquid system of a particular vehicle type and a paired interchangeable nozzle body with the nozzle base of the paired interchangeable nozzle body being matched to the particular vehicle type.

In Example 13, the subject matter of any one or more of Examples 1-12 optionally includes wherein the one or more assembly kits includes a first assembly kit for a sprayer as the particular vehicle type and a second assembly kit for a planter as the particular vehicle type.

In Example 14, the subject matter of any one or more of Examples 1-13 optionally include an attachment mechanism for securing the mounting adapter to the mounting block.

In Example 15, the subject matter of any one or more of Examples 1-14 optionally include an attachment mechanism for securing the nozzle body to the mounting block.

Example 16 is an assembly method for a nozzle assembly system, comprising: providing a universal mounting block including a first mounting location and a second mounting location; connecting an output component of a first interchangeable mounting adapter to the first mounting location of the mounting block, wherein the first interchangeable mounting adapter is configured for use with a first vehicle type; and connecting an input fitting of a first interchangeable nozzle body to the second mounting location of the mounting block; wherein the first interchangeable nozzle body is configured for use with the first vehicle type.

In Example 17, the subject matter of Example 16 optionally includes connecting mounting hardware of the first interchangeable mounting adapter to a part of the first vehicle type; and connecting an input component of the first interchangeable mounting adapter to a liquid system of the first vehicle type.

In Example 18, the subject matter of any one or more of Examples 16-17 optionally includes wherein connecting the input fitting of a first interchangeable nozzle body to the second mounting location aligns an operator of the universal mounting block with a shuttle of the first interchangeable nozzle body for modulating flow rate through the nozzle body.

In Example 19, the subject matter of any one or more of Examples 16-18 optionally include connecting a nozzle attachment to the nozzle base of the first interchangeable nozzle body.

In Example 20, the subject matter of any one or more of Examples 16-19 optionally include disconnecting the output component of the first interchangeable mounting adapter from the mounting block; and disconnecting the input fitting of the first interchangeable nozzle body from the mounting block; connecting an output component of a second interchangeable mounting adapter to the first mounting location of the mounting block, wherein the second interchangeable mounting adapter is configured for use with a second vehicle type; different than the first vehicle type; and connecting an input fitting of a second interchangeable nozzle body to the second mounting location of the mounting block; wherein the second interchangeable nozzle body is configured for use with a second vehicle type different than the first vehicle type wherein the output component of the first interchangeable mounting adapter and the output component of the second interchangeable mounting adapter have a similar physical configuration allowing for interchangeability with the mounting block; and wherein the input fitting of the first nozzle body and the input fitting of the second nozzle body have a similar physical configuration allowing for interchangeability with the mounting block.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A multifunctional nozzle assembly system, comprising:

a universal mounting block including a first mounting location and a second mounting location;

one or more interchangeable mounting adapters configured for coupling with the first mounting location, each of the one or more interchangeable mounting adapters including an input component for connecting to a liquid system of a vehicle and an outlet component for coupling to the mounting block, the vehicle including at least one of a sprayer or a planter and the input component using at least one of a quick-connect style fitting or a threaded fitting;

one or more interchangeable nozzle bodies configured for coupling with the second mounting location, each of the one or more interchangeable nozzle bodies including an input fitting for coupling to the mounting block and a nozzle base and a shuttle for modulating flow rate through the nozzle base; and wherein the universal mounting block further includes an operator and a control, the operator capable of interfacing with the shuttle of each of the one or more interchangeable nozzle bodies to modulate the flow rate through the respective nozzle body.

2. The multifunctional nozzle assembly system of claim 1, wherein the mounting block includes a first section housing the operator and controller and a second section extending from the first section, where in the second section includes the first mounting location and the second mounting location, wherein the first mounting location is positioned opposite of the second mounting location.

3. The multifunctional nozzle assembly system of claim 2, wherein the mounting block includes a flow meter positioned between the first mounting location and the second mounting location.

4. The multifunctional nozzle assembly system of claim 3, wherein the flow meter and the operator are communicatively coupled to a controller area network (CAN) communication bus.

5. The multifunctional nozzle assembly system of claim 3, wherein the mounting block includes a communications port for coupling to a controller area network (CAN) communication bus.

6. The multifunctional nozzle assembly system of claim 1, wherein the one or more interchangeable mounting adapters includes:

a first interchangeable mounting adapter having first mounting hardware for connecting to structure of a first sprayer, wherein the input component of the first interchangeable mounting adapter is capable of connecting to the liquid system of the first sprayer; and a second interchangeable mounting adapter having second mounting hardware for connecting to structure of a first planter; wherein the input component of the second interchangeable mounting adapter is capable of connecting to the liquid system of the first planter;

wherein a first output component of the first interchangeable mounting adapter and the second output component of the second interchangeable mounting adapter have physical characteristics complementary to the mounting block so that the first interchangeable mounting adapter and the second interchangeable mounting adapter can be interchangeably coupled with the mounting block.

7. The multifunctional nozzle assembly system of claim 1, wherein the one or more interchangeable nozzle bodies includes:

a first interchangeable nozzle body having a first shuttle;

a second interchangeable nozzle body having a second shuttle; and wherein the first input fitting of the first interchangeable nozzle body and the second input fitting of the second interchangeable nozzle body have physical characteristics complementary to the mounting block so that the first interchangeable nozzle body and the second interchangeable nozzle body can be interchangeably coupled with the mounting block;

wherein the nozzle base of the first interchangeable nozzle body and the nozzle base of the second interchangeable nozzle body are different.

8. The multifunctional nozzle assembly system of claim 7, wherein the nozzle base for the first interchangeable nozzle body is for use with a first sprayer and the nozzle base for the second interchangeable nozzle body is for use with a first planter.

9. The multifunctional nozzle assembly system of claim 8, wherein a controller variably controls the first shuttle and the second shuttle to variably control the first interchangeable nozzle body in a different manner than the second interchangeable nozzle body.

10. The multifunctional nozzle assembly system of claim 8, wherein the nozzle base of the first interchangeable nozzle body includes a connection element for connecting to one or more types of nozzle attachments, each type of nozzle attachment having a spray pattern or a droplet sizing different from other types of nozzle attachments of the one or more types of nozzle attachments.

11. The multifunctional nozzle assembly system of claim 8, wherein the nozzle base of the second interchangeable nozzle body includes a connection element for connecting to one or more types of nozzle attachments, each type of nozzle attachment having sized fixed openings different from other types of nozzle attachments of the one or more types of nozzle attachments.

12. The multifunctional nozzle assembly system of claim 1, further including one or more assembly kits, each assembly kit including a particular first mounting adapter for connecting to the liquid system of the vehicle and a paired interchangeable nozzle body with the nozzle base of the paired interchangeable nozzle body being matched to the vehicle.

13. The multifunctional nozzle assembly system of claim 12, wherein the one or more assembly kits includes a first assembly kit for a first sprayer as the vehicle-and a second assembly kit for a first planter as the vehicle.

14. The multifunctional nozzle assembly system of claim 1, further including an attachment mechanism for securing the mounting adapter to the mounting block, the attachment mechanism including at least one of a screw, a bolt, or a snap-fit lock.

15. The multifunctional nozzle assembly system of claim 1, further including an attachment mechanism for securing the nozzle body to the mounting block, the attachment mechanism including at least one of a screw, a bolt, or a snap-fit lock.

16. An assembly method for a nozzle assembly system, comprising:

providing a universal mounting block including a first mounting location and a second mounting location;

connecting a first output component of a first interchangeable mounting adapter to the first mounting location of the mounting block, wherein the first interchangeable mounting adapter is configured for use with a first vehicle, the first vehicle including at least one of a sprayer or a planter; and connecting a first input fitting of a first interchangeable nozzle body to the second mounting location of the mounting block; wherein the first interchangeable nozzle body is configured for use with the first vehicle.

17. The assembly method of claim 16, further comprising:

connecting mounting hardware of the first interchangeable mounting adapter to a part of the first vehicle; and connecting an input component of the first interchangeable mounting adapter to a liquid system of the first vehicle.

18. The assembly method of claim 17, wherein connecting the input fitting of the first interchangeable nozzle body to the second mounting location aligns an operator of the universal mounting block with a shuttle of the first interchangeable nozzle body for modulating flow rate through the nozzle body.

19. The assembly method of claim 17, further including connecting a nozzle attachment to a nozzle base of the first interchangeable nozzle body.

20. The assembly method of claim 16, further comprising:

disconnecting the first output component of the first interchangeable mounting adapter from the mounting block;

disconnecting the first input fitting of the first interchangeable nozzle body from the mounting block;

connecting a second output component of a second interchangeable mounting adapter to the first mounting location of the mounting block, wherein the second interchangeable mounting adapter is configured for use with a second vehicle different than the first vehicle, the second vehicle including at least one of a sprayer or a planter; and connecting a second input fitting of a second interchangeable nozzle body to the second mounting location of the mounting block; wherein the second interchangeable nozzle body is configured for use with the second vehicle different than the first vehicle;

wherein the first output component of the first interchangeable mounting adapter and the second output component of the second interchangeable mounting adapter have physical configuration complementary to the mounting block for allowing for interchangeability with the mounting block; and wherein the first input fitting of the first nozzle body and the second input fitting of the second nozzle body have physical configuration complementary to the mounting block for allowing for interchangeability with the mounting block.

* * * * *